(12) United States Patent
Luo et al.

(10) Patent No.: US 9,960,879 B2
(45) Date of Patent: May 1, 2018

(54) OPTICAL LINE TERMINAL COMMUNICATION METHOD AND DEVICE WITH DATA STRUCTURE

(71) Applicant: Futurewei Technologies, Inc., Plano, TX (US)

(72) Inventors: Yuanqiu Luo, Cranbury, NJ (US); Bo Gao, Wuhan (CN); Frank Effenberger, Colts Neck, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days. days.

(21) Appl. No.: 15/397,410

(22) Filed: Jan. 3, 2017

(65) Prior Publication Data
US 2017/0117984 A1    Apr. 27, 2017

Related U.S. Application Data

(63) Continuation of application No. 14/600,780, filed on Jan. 20, 2015, now Pat. No. 9,577,783.
(Continued)

(51) Int. Cl.
*H04B 10/27* (2013.01)
*H04J 14/02* (2006.01)

(52) U.S. Cl.
CPC .......... *H04J 14/0257* (2013.01); *H04B 10/27* (2013.01); *H04J 14/0275* (2013.01)

(58) Field of Classification Search
CPC . H04J 14/0256; H04J 14/0275; H04J 14/0282
See application file for complete search history.

(56) References Cited

U.S. PATENT DOCUMENTS

2002/0071149 A1\* 6/2002 Xu .................. H04B 10/032
398/5
2002/0184644 A1\* 12/2002 Lund .................. H04N 7/162
725/107
(Continued)

FOREIGN PATENT DOCUMENTS

| CN | 102355611 A | 2/2012 |
|---|---|---|
| CN | 102474441 A | 5/2012 |
| WO | 2010069390 A1 | 6/2010 |

OTHER PUBLICATIONS

"Series G: Transmission Systems and Media, Digital Systems and Networks, Digital Sections and digital line systems—Optical line systems for local and access networks, 40-Gigabit-capable passive optical networks 2 (NG-PON2): Physical media dependent (PMD) layer specification," ITU-T, G.989.2, Dec. 2014, 108 pages.
(Continued)

*Primary Examiner* — Danny Leung
(74) *Attorney, Agent, or Firm* — Futurewei Technologies, Inc.

(57) ABSTRACT

An optical line terminal (OLT) coupled to a plurality of optical network units (ONUs) through a passive optical network (PON). The OLT includes a transceiver configured to communicate via a management channel of a communication network with a plurality of OLTs. The communication includes sending or receiving a notification, wherein the notification includes the following: a source OLT identifier associated with a source OLT sending the notification, wherein the source OLT is configured to communicate over a first channel at a first wavelength of the PON; a destination OLT identifier associated with a destination OLT receiving the notification, wherein the destination OLT is configured to communicate over a second channel at a second wavelength of the PON; and an ONU identifier associated with a first ONU associated with the notification.

20 Claims, 12 Drawing Sheets

Related U.S. Application Data

(60) Provisional application No. 61/930,886, filed on Jan. 23, 2014.

(56) References Cited

U.S. PATENT DOCUMENTS

| | | | | |
|---|---|---|---|---|
| 2006/0115271 | A1* | 6/2006 | Hwang | H04J 14/0226 398/72 |
| 2008/0181603 | A1* | 7/2008 | Liu | H04B 10/0793 398/25 |
| 2009/0162063 | A1* | 6/2009 | Mizutani | H04J 3/0682 398/58 |
| 2009/0162064 | A1* | 6/2009 | Mizutani | H04J 3/0682 398/66 |
| 2009/0162065 | A1* | 6/2009 | Mizutani | H04J 3/0655 398/66 |
| 2009/0245790 | A1* | 10/2009 | Mizutani | H04J 3/0682 398/43 |
| 2012/0128357 | A1* | 5/2012 | Mukai | H04B 10/272 398/58 |
| 2013/0034356 | A1* | 2/2013 | Luo | H04B 10/272 398/72 |
| 2015/0050024 | A1* | 2/2015 | Luo | H04B 10/27 398/68 |
| 2015/0207585 | A1* | 7/2015 | Luo | H04J 14/0256 398/72 |
| 2015/0365192 | A1* | 12/2015 | Kim | H04J 14/0256 398/66 |
| 2016/0073180 | A1* | 3/2016 | Khotimsky | H04Q 11/0067 398/34 |
| 2016/0134953 | A1* | 5/2016 | Kramer | H04Q 11/0067 398/45 |

OTHER PUBLICATIONS

"Series G: Transmission Systems and Media, Digital Systems and Networks, Digital sections and digital line system—Optical line systems for local and access networks, 40-Gigabit-capable passive optical networks (NG-PON2): General requirements," ITU-T, G.989.1, Mar. 2013, 26 pages.

Foreign Communication From a Counterpart Application, PCT Application No. PCT/US2015/012080, International Search Report dated May 6, 2015, 2 pages.

Foreign Communication From a Counterpart Application, PCT Application No. PCT/US2015/012080, Written Opinion dated May 6, 2015, 9 pages.

Foreign Communication From a Counterpart Application, European Application No. 15740223.1, Extended European Search Report dated Jan. 2, 2017, 9 pages.

Notice of Allowance dated Oct. 4, 2016, 13 pages, Application No. 14/600,780, filed Jan. 20, 2015.

Office Action dated Jun. 17, 2016, 13 pages, U.S. Appl. No. 14/600,780, filed Jan. 20, 2015.

* cited by examiner

400A

410
PROVIDING NOTIFICATION TO A DESTINATION OPTICAL LINE TERMINAL (OLT) THAT A FIRST OPTICAL NETWORK UNIT (ONU) WILL TUNE TO A SECOND CHANNEL AT A SECOND WAVELENGTH ASSOCIATED WITH THE DESTINATION OLT OVER A MANAGEMENT CHANNEL OF AN INTER-OLT COMMUNICATION NETWORK

420
SENDING A TUNE WAVELENGTH MESSAGE TO THE FIRST ONU OVER THE FIRST CHANNEL INSTRUCTING THE FIRST ONU TO TUNE TO THE SECOND CHANNEL, WHEREIN THE NOTIFICATION AND THE TUNE WAVELENGTH MESSAGE COMPRISES A SOURCE OLT IDENTIFIER ASSOCIATED WITH THE SOURCE OLT, A DESTINATION OLT IDENTIFIER ASSOCIATED WITH THE DESTINATION OLT, AND AN ONU-IDENTIFIER ASSOCIATED WITH THE FIRST ONU

| Data Elements | Description |
|---|---|
| Serial Number | ONU Serial number is the unique identifier used to distinguish ONUs. |
| Current Receive wavelength (at ONU) | Identifies receive wavelength appearance for ONU. |
| Current Transmit wavelength (at ONU) | Identifies transmit wavelength appearance for ONU. |
| Destination Receive wavelength (at ONU) | Reflects the next state receive wavelength the ONU has understood it will migrate to. |
| Destination Transmit wavelength (at ONU) | Reflects the next state transmit wavelength the ONU has understood it will migrate to. |

| Data Elements | Description |
|---|---|
| Destination Wavelength TX transition | Required to transition ONU from one TX wavelength to another. |
| Destination Wavelength RX transition | Required to transition ONU from one RX wavelength to another. |
| Indication of destination channel pair optional features | -Protocol indication<br>-Line rates<br>-Sleep mode activation<br>-Line code NRZ or Raman optimized code |
| ODN ID | Each ODN needs to be assigned a unique ID so that the ODN shared across multiple systems can be quickly identified. |
| Port wavelength assignment | The protocol can pass ODN assignments for each OLT channel pair. This provides a tool by which to verify wavelengths that could interfere with existing service. |
| OLT ID | OLT ID is the unique identifier used to distinguish OLTs. |

| Data Elements | Description |
| --- | --- |
| Disable ONU | OLT can send a request to neighboring OLTs to disable a specified ONU that may be in a rogue state. Parameter is based on ONU identifier(s) |
| State change acknowledgment | When a request to change the state of an ONU is submitted to a neighbroing OLT, the OLT should acknowledge the demand, to the source OLT originating the state change or the submission of the request to the ONU. |
| Transition notice | A broadcast notice by originating OLT that goes out to all OLTs that share an ODN to notify them that an ONU is making a transition from a source OLT to a specified destination OLT. The purpose of the notification is to warn other OLTs that a transition is occurring in case there are issues during the transition process. |
| Quiet Window Synchronization | |
| Attendance report | An OLT verifies that it has 2-way communication, to all of its ONUs. Missing ONUs become suspects when trying to isolate rogue ONUs. By broadcasting a disable message for missing ONUs across all OLTs, the chance of stopping the event increases. |

| Format Element | Description |
|---|---|
| ICTP: | Uniform prefix of ICTP primitives |
| <Name> | The ICTP primitive name |
| ODN ID | The identity of the ODN or, equivalently, of the NG-PON2 PON system within operator's administrative domain or an open access domain. This is a reference value set by the OSS. |
| SRC | The TWDM channel index of the message sender or TX for a transaction. |
| DST | The TWDM channel index of the message recipient, BCST for a message broadcast to all CTs with the NG-PON2 PON system, or this TWDM channel for a transaction |
| Parameters | The parameter list specific to the given ICTP primitive. |

FIG. 10

| Primitive Name | Type | Parameters | Description |
|---|---|---|---|
| ICTP:CTProfile | MEssage | DS WLCH descriptor; US WLCH descriptor | A broadcast message notifying the TWDM CTs of the NG-PON2 PON system of the relevant wavelength channel configuration and status parameters. Each TWDM CT collects the information contained in the individual ICTP:CTProfile() messages and includes it into the TWDM channel profile PLOAM messages sent downstream. |
| ICTP:Tune-In | Transaction Commit | ONU-ID, OldChIX | Commit indication of a transaction affirming a scheduled handover of an ONU identified by ONU-ID into the given TWDM channel from the TWDM channel identified by OldChIX. The transaction typically involves three parties, the source TWDM channel, the target TWDM channel, and the appropriate management entity, is coordinated by either the source TWDM channel or the management entity, and is executed via the two-phase commit protocol |
| ICTP:Tune-Out | Transaction Commit | ONU-ID, NewChIX | Commit indication of a transaction affirming a scheduled handover of an ONU identified by ONU-ID out of the given TWDM channel to the TWDM channel identified by OldChIX. The transaction typically involves three parties, the source TWDM channel, the target TWDM channel, and the appropriate management entity, is coordinated by either the source TWDM channel or the management entity, and is executed via the two-phase commit protocol. |
| ICTP:Alert | Message | ONU-ID, OldChIX | A broadcast message notifying the TWDM CTs of the NG-PON2 PON system of the loss of communication with the ONU identified by ONU-ID which was last seen at the TWDM channel identified by OldChIX. |
| ICTP:Confirm | Message | ONU-ID | A message from the new host TWDM channel of the ONU-ID to its previous host TWDM channel, notifying of successful arrival of ONU to the new host TWDM channel. |
| ICTP:ACKNotif | Message | ONU-ID | A message from the current host TWDM channel of the ONU-ID to its future host TWDM channel, notifying of the Tuning_Response acknowledgement received from the ONU. |

OPTICAL LINE TERMINAL COMMUNICATION METHOD AND DEVICE WITH DATA STRUCTURE

CROSS-REFERENCE TO RELATED APPLICATIONS

This application is a continuation application of U.S. patent application Ser. No. 14/600,780 filed on Jan. 20, 2015 by Futurewei Technologies, Inc. and titled "Optical Line Terminal Communication Method and Device With Data Structure," which claims priority to U.S. provisional patent application No. 61/930,886 filed on Jan. 23, 2014 by Yuanqiu Luo, et al., and titled "Optical Line Terminal Communication Data Structure," which are incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." For example, the PON is a telecommunications network that includes a point-to-multi-point (P2MP) network and is comprised of an optical line terminal (OLT) at the central office, an optical distribution network (ODN), and a plurality of optical network units (ONUs) at the customer premises.

The evolution for PON includes asynchronous transfer mode PON (APON), which evolved into Broadband PON (BPON), which is backward compatible with APON, which is defined by the International Telecommunications Union Telecommunications Standard Sector (ITU-T) G.983 standard. Other systems include Ethernet PON (EPON) for Ethernet and internet traffic. Still other alternatives include Gigabit PONs (GPONs), defined by ITU-T G.984, which have enhanced capability compared to APONs and BPONs and are backwards compatible. The G.984 standard series defines general characteristics of GPON (G. 984.1) as well as physical layer specification (G.984.2), transmission layer specification (G.984.3), and ONU management and control specification (G.984.4).

With an increasing need for open access, PON systems having multiple OLTs are appearing. A multi-OLT PON can enable a plurality of service providers to share infrastructure. However, a multi-OLT PON system presents complications in the coordination and control of the various OLTs. Consequently, there is a need in the art for methods and apparatus for inter-OLT communication and control.

SUMMARY

Accordingly, embodiments of the present invention provide an inter-OLT communication protocol to manage the discovery and transition of ONUs, especially when re-allocating an ONU across OLT ports in a time- and wave-length-division multiplexing (TWDM) PON system.

In some embodiments of the present invention, an OLT is disclosed, wherein the OLT is coupled to a plurality of ONUs through a PON. The OLT includes a transceiver configured to communicate via a management channel of a communication network with a plurality of OLTs. The communication includes sending or receiving a notification, wherein the notification includes the following: a source OLT identifier associated with a source OLT sending the notification, wherein the source OLT is configured to communicate over a first channel at a first wavelength of the PON; a destination OLT identifier associated with a destination OLT receiving the notification, wherein the destination OLT is configured to communicate over a second channel at a second wavelength of the PON; and an ONU identifier associated with a first ONU associated with the notification.

In other embodiments, a method for handing off communications between devices is disclosed. The method is implemented by a source OLT communicatively coupled to a plurality of ONUs through a PON and is configured to communicate over a first channel at a first wavelength of the PON. The method includes providing notification to a destination OLT that a first ONU will tune to a second channel at a second wavelength associated with the destination OLT over a management channel of an inter-OLT communication network. The method includes sending a "tune wavelength" message to the first ONU over said first channel instructing the first ONU to tune to the second channel. The notification and the tune wavelength message includes a source OLT identifier associated with the source OLT, a destination OLT identifier associated with the destination OLT, and an ONU identifier associated with the first ONU.

In another embodiment, a method of performing a handing off process of communications between devices is disclosed. The method is implemented by a destination OLT communicatively coupled to a plurality of ONUs through a PON, wherein the destination OLT is configured to communicate over a second channel at a second wavelength of the PON. The method includes receiving a notification message from a source OLT over a management channel of a communication network indicating that a first ONU will tune to the second channel at the second wavelength. The source OLT is communicatively coupled to the plurality of ONUs through the PON and is configured to communicate over a first channel at a first wavelength of the PON. The notification message includes a source OLT identifier associated with the OLT, a destination OLT identifier associated with the destination OLT, and an ONU identifier associated with the first ONU. The method includes sending a "handoff grant" message to the first ONU over the second channel. The method includes receiving an acknowledgment from the first ONU over the second channel indicating receipt of the handoff grant message.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIGS. 4A-B are flow diagrams illustrating exemplary processes for handing off an ONU from one OLT to another OLT, in accordance with embodiments of the present disclosure.

FIG. 7 is a table illustrating exemplary ONU data elements, in accordance with one embodiment of the present disclosure.

FIG. 8 is a table illustrating exemplary OLT data elements, in accordance with one embodiment of the present disclosure.

FIG. 9 is a table providing exemplary state change requests and notifications, in accordance with one embodiment of the present disclosure.

FIG. 10 is a table illustrating exemplary Inter-Channel Termination Protocol (ICTP) protocol primitive invocation format elements.

FIG. 11 is a table illustrating exemplary ICTP protocol primitives.

DETAILED DESCRIPTION

Figure 1:
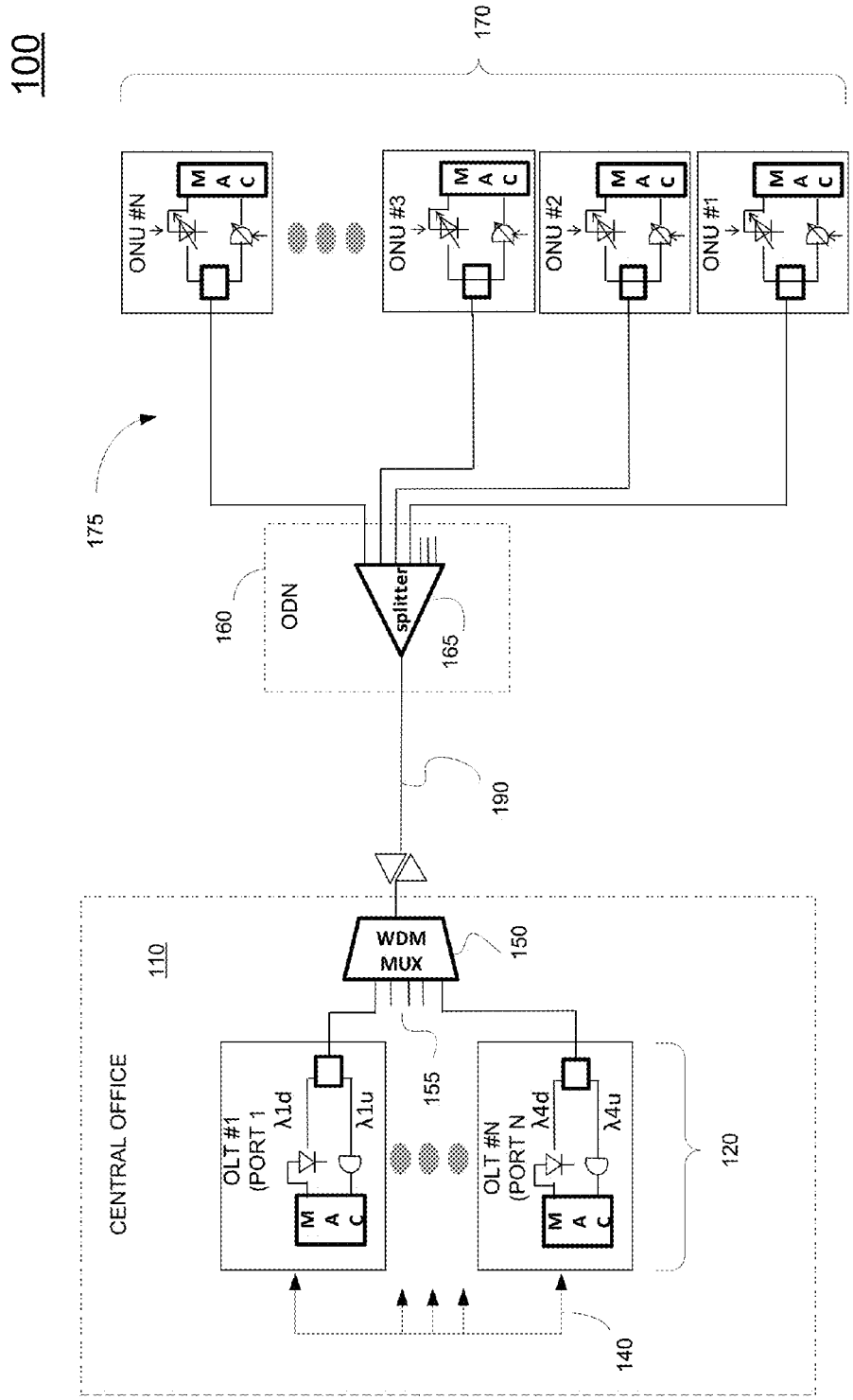
FIG. 1 is a block diagram of a multi-OLT PON system configured to perform a handoff operation of an ONU from one OLT to another OLT through inter-OLT communication, in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present invention provide an inter-OLT communication protocol to manage the discovery and transition of ONUs, especially when re-allocating an ONU across OLT ports in a TWDM PON system.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities, and refer to the action and processes of a computing system, or the like, including a processor configured to manipulate and transform data represented as physical (electronic) quantities within the computer system's registers and memories into other data similarly represented as physical quantities within the computer system memories or registers or other such information storage, transmission or display devices.

Flowcharts of examples of methods for guaranteeing network control traffic are provided, according to embodiments of the present invention. Although specific steps are disclosed in the flowcharts, such steps are exemplary. That is, embodiments of the present invention are well-suited to performing various other steps or variations of the steps recited in the flowcharts. Also, embodiments described herein may be discussed in the general context of computer-executable instructions residing on some form of computer-readable storage medium, such as program modules, executed by one or more computers or other devices. By way of example, and not limitation, the software product may be stored in a nonvolatile or non-transitory computer-readable storage media that may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

FIG. 1 is a block diagram of a multi-OLT PON (e.g., NG-PON2) system 100 configured to perform a handoff operation or "handoff" of an ONU from one OLT to another OLT through inter-OLT communication, in accordance with one embodiment of the present disclosure. As the PON system 100 access network grows, carrier/operators need to operate and maintain multiple OLT ports, which may require handing off ONUs from one OLT port to another. For example, carrier/operators may turn off certain OLT ports to save power consumption at the central office 110, and need to hand off ONUs so that service is not interrupted. In another example, during normal operation, if an OLT port is heavily loaded with network traffic, the corresponding OLT may perform load balancing between channels and may command some of its associated ONUs to tune their downstream and/or upstream wavelength channels to another OLT port having lighter traffic.

PON system 100 is a communication network that does not require any active components to distribute data between the plurality of OLTs 120 and the plurality of ONUs 170. For example, passive optical components in the ODN 160 are used to distribute data between the OLTs and the ONUs. Examples of PONs suitable for implementing embodiments of the present invention are described within the context of the G.989 series of ITU-T Recommendations describing the latest or next generation of passive optical networks (NG-PON2) providing 40 Gigabit-capable communications for residential, business, mobile backhaul, and other applications, all of which are incorporated by reference herein as if reproduced in their entirety. NGPON2 is based on wavelength-domain multiplexing, and comprises channel or wavelength pairs which also use time-domain multiple access as well as dedicated, point-to-point channel pairs.

NG-PON2 variants can differ in channel bit rates, passive reach, usable wavelength ranges, and also with regard to several implementation options. NG-PON2 is backward compatible with G-PON and asymmetric 10-gigabit PON (XG-PON1), which ensures that NG-PON2 can be used for various applications, such as access, backhaul and fronthaul applications. Other PONs supporting embodiments of the present invention include APON, BPON, and wavelength-division multiplexing (WDM) PON, as defined by one or more standards.

In particular, PON system 100 may comprise a plurality of OLTs 120, in FIG. 1 represented as OLTs 1 ... N. The plurality of OLTs 120 are managed within a central office 110, in one embodiment. In embodiments of the present invention, inter-OLT communication is implemented to facilitate the transfer of ONUs from one OLT port to another within the central office 110. For example, central office 110 includes an inter-OLT communication platform or management channel 140 that allows for communication between the plurality of OLTs 120. In one embodiment, the inter-OLT communication includes broadcasting messages from one OLT to the other OLTs in one communication. In another embodiment, the inter-OLT communication is peer-to-peer, such that one OLT can communicate directly with another OLT. In addition, other devices can be coupled to the communication platform 140 to allow for communication with the OLTs 120. For example, a separate master OLT controller provides for OLT management and control (e.g., providing conflict resolution between OLTs). As examples, central office 110 can be located in one site having local area networking, or across multiple sites communicating through a wide area network.

Embodiments of the present invention disclose the communication data structure to support OLT communication, as when performing handoff of one or more ONUs from one OLT to another. The data structure contains key information elements that are communicated among the OLT ports. Specifically, the data structure applies to system or network control and management between multiple OLT ports.

The plurality of OLTs 120 are communicatively coupled to the ODN 160 through a shared infrastructure, such as multiplexer (MUX) 150. In one embodiment, MUX 150 performs WDM. In another embodiment, MUX 150 can also be configured to perform time division multiplexing, such that MUX 150 is able to perform TWDM. For example, next generation PON technologies implemented in PON system 100 employ multiple wavelengths to stack time-division multiplexing PONs (TDM-PONs) into a TWDM-PON. As such, each OLT port in a TWDM-PON is generally an XG-PON running on a pair of downstream and upstream wavelengths. The stacked feature of TWDM-PON provides support to the pay-as-you-grow requirement for carriers/operators. That is, a carrier/operator can add new OLT ports in order to scale up network performance to support new customers.

Specifically, each of the plurality of OLTs 120 operate on a different optical wavelength for downstream data communication (e.g., towards the ONUs 170), and operate on a different wavelength for upstream data reception (e.g., from the ONUs 170). For example, each OLT can have a wavelength pair of communication channels. Each OLT is coupled to a respective port of the WDM MUX 150 via separate channels 155 (e.g., fibers). More particularly, in the downstream direction, the WDM MUX 150 multiplexes optical signals from the channels 155 onto a single channel 190 (e.g., optical fiber), which is delivered to the ODN. MUX 150 can be bi-directional, such that in the upstream direction, WDM MUX 150 demultiplexes the signal over channel 190 by taking the single input signal and selecting one of the data output lines leading to a corresponding OLT (e.g., OLT port).

ODN 160 is a data distribution system that can include optical fiber cables or other optical transmission medium, couplers, splitters, distributors and/or other equipment. For example, as shown in FIG. 1, ODN 160 can include a splitter 165 that copies the signal on channel 190 and distributes the copied signals to the plurality of ONUs 170 (numbered 1 ... N) over a channel network 175 (e.g., fibers). Splitter 165 is bi-directional, capable of combining upstream signals from the plurality of ONUs 170 into one signal transmitted over channel 190, and of copying and distributing a downstream signal from the plurality of OLTs 120 on channel 190 to the plurality of ONUs 170 over the channel network 175. In the upstream direction, signals from the ONUs 170 are combined by a splitter into one signal before being transmitted over channel 190. More particularly, the devices located within ODN 160 are passive optical components that do not require any power to distribute data signals between the plurality of OLTs 120 and the plurality of ONUs 170.

An ONU can be any device that is configured to communicate with a corresponding OLT, wherein the ONU is associated with a customer or user (not shown), and is typically located at the customer site. Generally, an ONU provides an intermediary or interface between a customer and an OLT. For example, the plurality of ONUs 170 can forward data received from the plurality of OLTs 120 to one or more customers. In addition, the plurality of ONUs 170 can forward data received from the customer back to the plurality of OLTs 120.

More particularly, an ONU can include an optical transmitter configured to send optical signals to the plurality of OLTs 120, and an optical receiver configured to receive optical signals from the OLTs 120. That is, the ONU can tune to a selectable downstream wavelength and another selectable upstream wavelength, which forms a wavelength pair. The ONU can include a converter that converts an optical signal into electrical signals for the customer end, such as converting to an asynchronous transfer mode (ATM) or Ethernet format. Further, the ONU can include a second transmitter and/or receiver for sending and/or receiving signals to and from the customer end.

Figure 2:
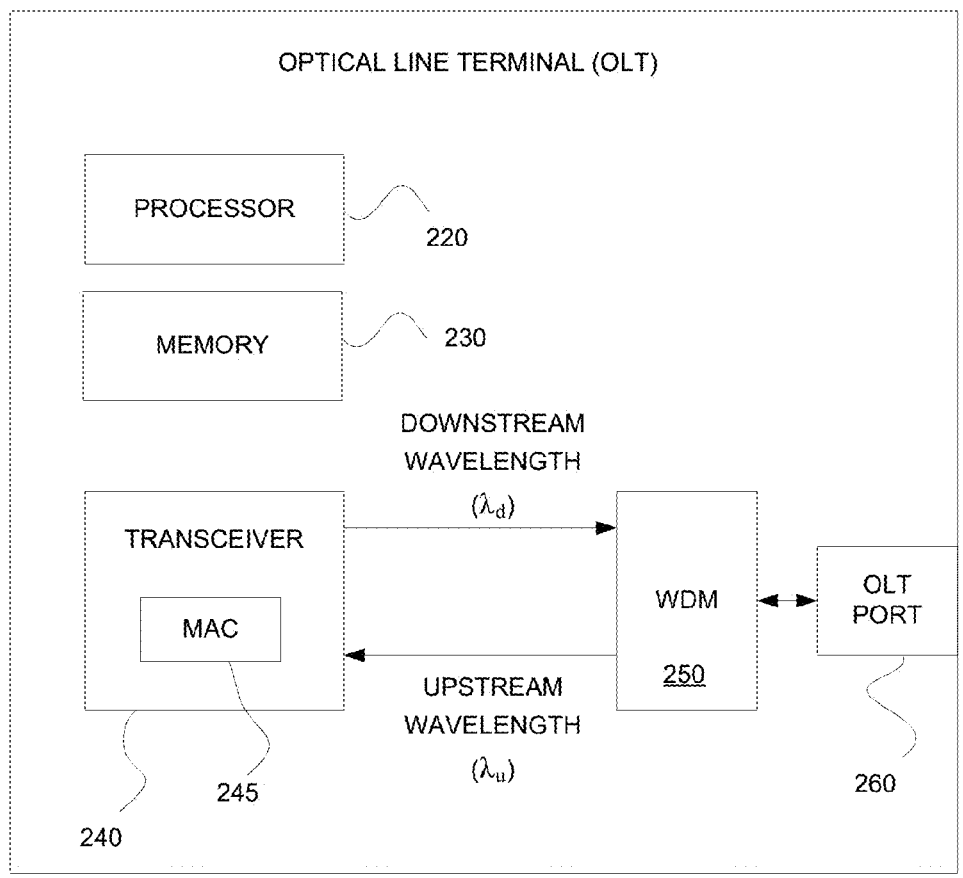
FIG. 2 is a block diagram of an OLT configured to perform a handoff operation of an ONU, in accordance with one embodiment of the present disclosure.

FIG. 2 is a block diagram of an OLT 200 configured to perform handoff of an ONU, in accordance with one embodiment of the present disclosure. For example, OLT 200 can be implemented within the plurality of OLTs 120 in PON system 100 of FIG. 1.

Specifically, OLT 200 (e.g., a source OLT) is coupled to a plurality of ONUs through a PON, and is configured to communicate with one or more ONUs over a first channel at a first wavelength of the PON. As a source, OLT 200 is configured to communicate with a first ONU over the first channel. In addition, when handing off the ONU, OLT 200 is configured to provide a notification to the destination OLT that the ONU will tune to a second channel at a second wavelength that is associated with the destination OLT over a management channel of an inter-OLT communication network.

It is appreciated that OLT 200 is configured to communicate information via a data structure supporting OLT communication. Specifically, the data structure defines the key information entities that are needed to perform management of the OLT ports, such as when performing handoff of one or more ONUs from one OLT to another. In one embodiment, when performing handoff, the data structure in the notification includes at least: a source OLT identifier associated with the source OLT; a destination OLT identifier associated with the destination OLT; and an ONU identifier associated with the ONU being handed over. Other information in the data structure can also be included, as will be described more fully below.

In particular, OLT 200 includes a processor 220 and memory 230, where the processor 220 is configured to execute computer-executable instructions stored in the memory 220. For example, processor 220 is configured to perform handoff of an ONU from one OLT to another OLT through inter-OLT communication, or to enable communications from one OLT to an ONU through another OLT. In one embodiment, the processor 220 performs the functions of one or more of the example embodiments described and/or illustrated herein, such as the operations performed by any of the OLTs 120 in FIG. 1. Further, the processor 220 can be included within a single or multi-processor computing device or system capable of executing computer-readable instructions. In a general form, a computing device includes at least one processor and a system memory. System memory is coupled to the processor, and generally represents any type or form of volatile or non-volatile storage device or medium capable of storing data and/or other computer-readable instructions. Examples of system memory include, without limitation, random access memory (RAM), read only memory (ROM), Flash memory, or any other suitable memory device.

Specifically, the OLT 200 can be any device that its configured to communicate with a plurality of ONUs (e.g., ONUs 120 of FIG. 1 in a PON) and/or another network (not shown). That is, OLT 200 can be configured to forward data received from the network to the plurality of ONUs, and to forward data received from the ONUs to the network. OLT 200 also includes a converter that converts data received from another network to a format compatible with the plurality of ONUs located on a downstream direction, in one embodiment.

Downstream and upstream communications to and from OLT 200 are facilitated through transceiver 240, such that transceiver 240 is configured to forward communications to ONUs and to receive communications from the ONUs over an ODN network coupled to port 260. Transceiver 240 is coupled to WDM 250 that acts as a multiplexer/demultiplexer when transmitting and/or receiving communications to and from port 260, wherein port 260 is coupled to a plurality of ONUs through a corresponding ODN, as previously described.

In one embodiment, transceiver 240 includes a medium access control (MAC) component that provides addressing and channel access control mechanisms for a plurality of OLTs sharing a single communication channel in the ODN network. For example, TWDM methods allow communications from one or more OLTs connected to a multi-point transmission medium (e.g., single channel) to share its capacity (e.g., transmit and receive). For example, one multiplexing method allows several data streams to share the same physical communication channel. In one embodiment, MAC component 245 transmits Ethernet frames.

As shown in FIG. 2, OLT 200 is configured to communicate on different optical wavelengths for upstream and downstream traffic, which form the OLT wavelength pair. For example, in the downstream direction, OLT sends downstream communications on wavelength $\lambda_d$, and receives upstream communications on wavelength $\lambda_u$. The wavelength pair, including the upstream and downstream wavelengths, can be different for each of the OLTs in a PON. As such, when handing off one ONU from one OLT to another, the inter-OLT communications identify the wavelengths within embodiments of the present invention.

Figure 3:
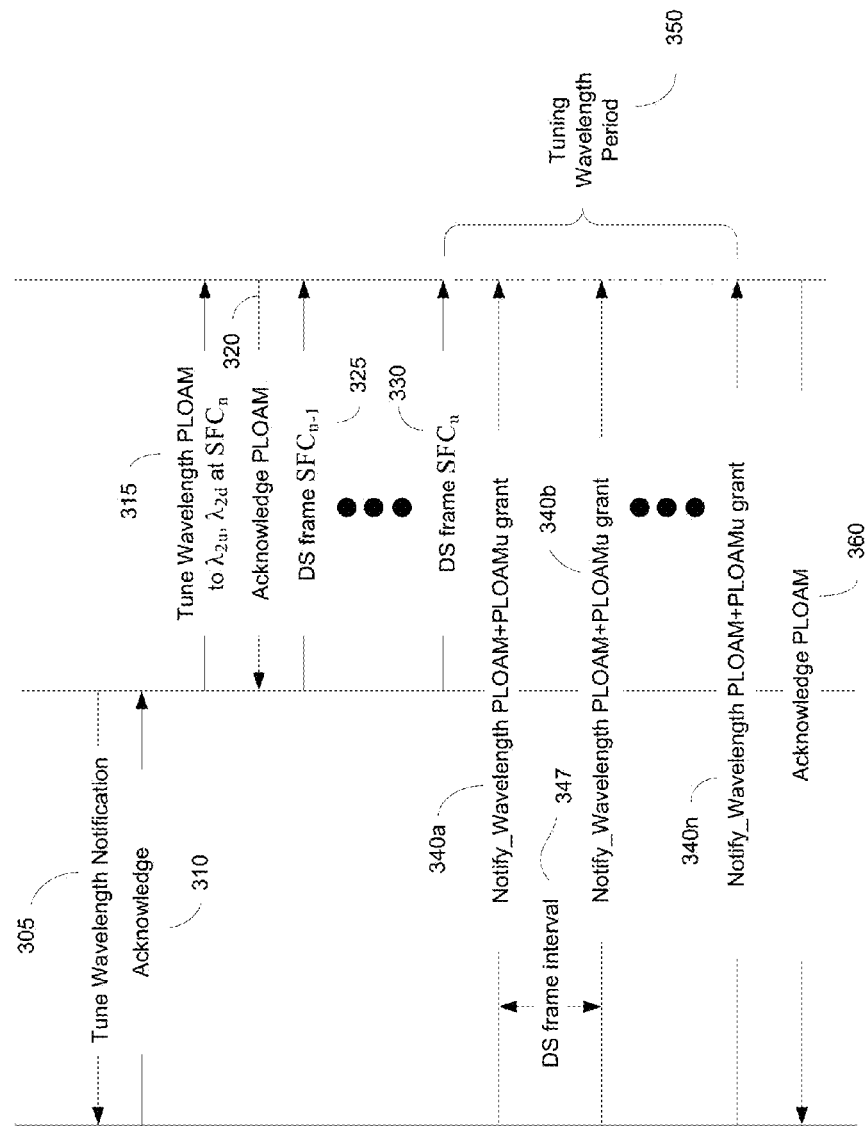
FIG. 3 is a diagram showing an exemplary flow of messages when handing off an ONU from one OLT to another OLT, in accordance with one embodiment of the present disclosure.

FIG. 3 is an information flow diagram 300 showing the flow of messages when handing off an ONU from one OLT to another OLT, in accordance with one embodiment of the present disclosure. Specifically, the messages shown in FIG. 3 are delivered between a source OLT, a destination OLT, and an ONU. The source OLT is handing off the transmitting (downstream messaging) and/or receiving (upstream messaging) of messages with the ONU to the destination OLT. That is, the source OLT directs an ONU to tune one or more of its wavelengths to work with the port of the destination OLT. For example, an ONU can be transferred between OLTs of a particular carrier to perform bandwidth management. In another example, an ONU can be transferred between OLT operating system different carriers because a customer is changing his or her carrier network. In both of these cases, the source OLT and the destination OLT are known components, and FIG. 3 illustrates the messaging performed between the OLTs when handing off an ONU.

In one embodiment, it is assumed that the source OLT (prior to performing handoff of an ONU to the destination OLT) has previously determined or received the necessary information contained in a data structure to perform the handoff process, such as one or more of the following: 1) a destination OLT identifier; 2) a source OLT identifier; 3) an ONU identifier; 4) the current downstream wavelength/channel for the ONU; 5) the current upstream wavelength/channel for the ONU; 6) a possible new downstream wavelength/channel for the ONU; 7) a possible new upstream wavelength/channel for the ONU; 8) an ONU turning start time; and 9) an acknowledge code. In another embodiment, the information is determined and/or communicated between the source OLT, destination OLT, and ONU during the handoff process.

In particular, the source OLT and the destination OLT need to be able to coordinate with one another to efficiently handle the transition of the ONU from one OLT to another. During the coordination process, the source OLT will communicate with the destination OLT an identifier indicating which ONU is going to retune. The source OLT will or has determined details about the destination OLT wavelength pair. The destination OLT acknowledges its readiness to receive the ONU prior to commencing the transition. The destination OLT also acknowledges when the transition is complete. Each OLT has an OLT ID to uniquely identify itself in the inter-OLT communication process.

In one embodiment, some of the messages disclosed in FIG. 3 conform with a physical layer operation and an administration and maintenance (PLOAM) control message format, where the PLOAM message is a protocol used in a corresponding PON for sending messages between the OLTs and the ONUs. For example, PLOAM messaging is defined in the G.989 series of ITU-T Recommendations, previously introduced. Of course, any suitable format used for communicating control and management messages can also be used.

As shown in FIG. 3, at 305 the source OLT sends a tune wavelength notification to the destination OLT. That is, the source OLT notifies the destination OLT that a specified ONU will change one or more of its wavelengths (upstream and/or downstream wavelengths) to those that are supported by the destination OLT. The notification is delivered over the inter-OLT communication network, such as by broadcasting the tune wavelength notification over a management channel. OLTs are able to filter the notification, such that only the OLT to which the notification is directed accepts the message, where the OLTs that are not targeted will discard the notification message. As such, at 310, the destination OLT sends back to the source OLT an acknowledgment that the notification has been received. In one embodiment, the destination OLT also sends back additional information such as its upstream (e.g., $\lambda_{u2}$) and/or downstream (e.g., $\lambda_{d2}$) wavelengths.

Once the destination OLT confirms the tune wavelength notification, at 315, the source OLT sends a tune wavelength command to the ONU instructing the ONU to tune to the new wavelength or wavelengths at a particular time. In the example of FIG. 3, the tune wavelength command instructs the ONU to tune to new upstream and downstream wavelengths associated with the destination OLT. That is, the source OLT tells the ONU to tune its current wavelength pair of $\lambda_{u1}$, $\lambda_{d1}$ to the new wavelength pair of $\lambda_{u2}$, $\lambda_{d2}$. As such, the command includes at least the wavelength pair for the destination OLT (e.g., upstream wavelength $\lambda_{u2}$, and downstream wavelength $\lambda_{d2}$), as previously described.

Though the example provided in FIG. 3 shows that the ONU can be instructed to tune to both the upstream and downstream wavelengths associated with the destination OLT, other embodiments and examples provide for selecting tuning, such that only the tune wavelength command instructs the ONU to tune to either the upstream wavelength $\lambda_{u2}$, or downstream wavelength $\lambda_{d2}$. That is, the ONU will be tuning to one or both of the upstream and downstream channels in the wavelength pair.

In addition, the tune wavelength command provides instructions as to when to start the tuning process by including a time for the ONU to start tuning to the new wavelength or wavelengths. For example, the PON includes a system clock that is known to all components of the PON system, or at least those entities involved in the handing off process. In one embodiment, the system clock implements a super frame counter (SFC) that uses frames as a means for coordinating time. As shown, the tune wavelength command includes a tuning start time $SFC_n$, which indicates the time when the ONU should begin tuning to the new wavelength or wavelengths.

At 320 of FIG. 3, the ONU sends back an acknowledgment to the source OLT indicating receipt of the tune wavelength command. In the meantime, the source OLT can send down SFC frame messages counting down the time to the tuning start time $SFC_n$, to include messages 325 and 330. Up to this point, at least between messages 305 to 330, the ONU is operating in a normal operation state in the ONU state machine.

In addition, the destination OLT knows that the ONU is tuning to its upstream wavelength $\lambda_{u2}$, and/or downstream wavelength $\lambda_{d2}$ beginning with the tuning start time $SFC_n$. As such, at some point after the tuning start time, indicated by $SFC_n$, the destination OLT sends out a notify wavelength message. That is, the notify wavelength message pings the ONU to acknowledge when it has completed its tuning process and can communicate with the destination OLT.

The destination OLT periodically sends the notify wavelength message until the ONU returns an acknowledgment at 360, in one embodiment. For example, notify wavelength messages (e.g., 340a-n) are delivered after every downstream (DS) frame interval 347, which includes one or more DS frames. In one embodiment, the notify wavelength message is broadcasted to the plurality of ONUs. In addition, up to this point at least between messages 330 and 340n, the ONU is operating in a wavelength-tuning-operation state in the ONU state machine.

When the ONU successfully finishes wavelength tuning, it is able to communicate with the destination OLT using the upstream wavelength $\lambda_{u2}$, and/or the downstream wavelength $\lambda_{d2}$. As such, the ONU is able to receive the latest notify wavelength message 340n, and respond by sending an acknowledge message 360 back to the destination OLT. The acknowledgment message 360 indicates that the ONU is now online using the new downstream and/or upstream wavelengths.

FIG. 4A is a flow diagram 400A illustrating an exemplary process for handing off communications of at least one channel used by an ONU from the source OLT to a destination OLT as implemented by the source OLT, in accordance with one embodiment of the present disclosure. In one embodiment, flow diagram 400A is a computer implemented method for handing off communications of at least one channel used by an ONU from the source OLT to a destination OLT as implemented by the source OLT. In another embodiment, flow diagram 400A is implemented within a computer system including a processor and memory coupled to the processor and having stored therein instructions that, if executed by the computer system cause the system to execute the method for handing off communications of at least one channel used by an ONU from the source OLT to a destination OLT as implemented by the source OLT. In still another embodiment, instructions for performing the method are stored on a non-transitory computer-readable storage medium having computer-executable instructions for causing a computer system to perform the method for handing off communications of at least one channel used by an ONU from the source OLT to a destination OLT as implemented by the source OLT. The operations of flow diagram 400A are implemented within an OLT shown in FIGS. 1 and 2, in some embodiments of the present disclosure. In addition, flow diagram 400A can further describe one or more operations performed during the handing off of an ONU from one OLT to another as described in the information flow diagram 300 of FIG. 3.

Flow diagram 400A of FIG. 4A discloses the process performed by a source OLT when handing off communications with an ONU to a destination OLT. That is, the source OLT is handing off the transmitting (downstream messaging) and/or receiving (upstream messaging) of messages with the ONU to the destination OLT. The source OLT is communicatively coupled to a plurality of ONUs through a PON. In particular, the source OLT is configured to communicate over a first channel at a first wavelength of the PON. The first channel can be either the downstream channel or the upstream channel.

Flow diagram 400A is performed after the source OLT determines or is instructed to perform the handing off of one or more wavelengths used to communicate with an ONU. At 410, the method includes providing notification to the destination OLT that a first ONU will tune to a second channel at a second wavelength associated with the destination OLT over a management channel of an inter-OLT communication network. For example, the source OLT can be handing off to a destination OLT downstream communication to an ONU that is currently being handled by the source OLT. In another example, the source OLT can be handing off to a destination OLT upstream communication with an ONU that is currently being handled by the source OLT. In still another example, the source OLT can be handing off to a destination OLT both upstream and downstream communication with an ONU that is currently being handled by the source OLT. An acknowledgment can also be received at the source OLT, from the destination OLT, indicating receipt of the notification message.

In one embodiment, the notification message is broadcast to a plurality of OLTs over a management channel. That is, the notification message is broadcast over an inter-OLT communication platform. The OLT intended to receive the notification message is able to determine that the notification message is targeted to itself. For example, OLTs are able to parse the header to determine which destination OLT should handle the notification message.

Necessary information used for implementing the handoff is also determined or provided to the source OLT. In one embodiment, the OLT identifier (OLT-ID) provide one or more key pieces of information. The content of the OLT-ID could be the PON ID specified in the ITU-T Recommendation 987.3, the channel IDs for a downstream and upstream wavelength pair; the ID of an individual wavelength/channel; the PON TAG specified in ITU_T Recommendation 987.3; or the ID of an OLT port, etc.

At 420, the method includes sending a tune wavelength message to the first ONU over the first channel instructing the first ONU to tune to the second channel. For example, the source OLT can send a command to the first ONU to tune to the downstream wavelength associated with the destination OLT in order to receive data from the destination OLT. In another instance, the source OLT can send a command to the first ONU to tune to the upstream wavelength associated with the destination OLT, such that the first ONU will now send messages to the destination OLT instead of the source OLT. In still another instance, the source OLT can send a command to the first ONU to tune to both the upstream and the downstream wavelengths associated with the destination OLT, such that the first ONU will now only communicate with the destination OLT. An acknowledgment can also be received at the source OLT from the ONU indicating receipt of the tune wavelength message.

In one embodiment, the tune wavelength message is broadcast to a plurality of ONUs through a corresponding ODN using a downstream channel associated with the source OLT. This downstream channel can also be handed off, in one implementation. The ONU intended to receive the notification message determines that the tune wavelength message is targeted to itself. For example, ONUs are able to parse the header to determine the which destination ONU should handle the tune wavelength message.

In one embodiment, the information necessary to implement a handoff included within the notification message and/or the tune wavelength message is provided in a data structure. For example, the notification message and/or tune wavelength message includes at least one of the following: 1) a destination OLT identifier; 2) a source OLT identifier; and 3) an ONU identifier. In another embodiment, the notification message and/or tune wavelength message includes additional information, including at least one of the following: 1) the current downstream wavelength/channel for the ONU; 2) the current upstream wavelength/channel for the ONU; 3) a possible new downstream wavelength/channel for the ONU; 4) a possible new upstream wavelength/channel for the ONU; 5) an ONU turning start time; and 6) an acknowledge code. For illustration, the data structure provided in a notification message and/or the tune wavelength message can be structured as follows:

```
{
Destination OLT-ID,
Source OLT-ID,
ONU-ID,
ONU current downstream wavelength/channel,
ONU current upstream wavelength/channel,
ONU new downstream wavelength/channel,
ONU new upstream wavelength/channel,
ONU tuning start time,
Acknowledge code,
}
```

Figure 4B:
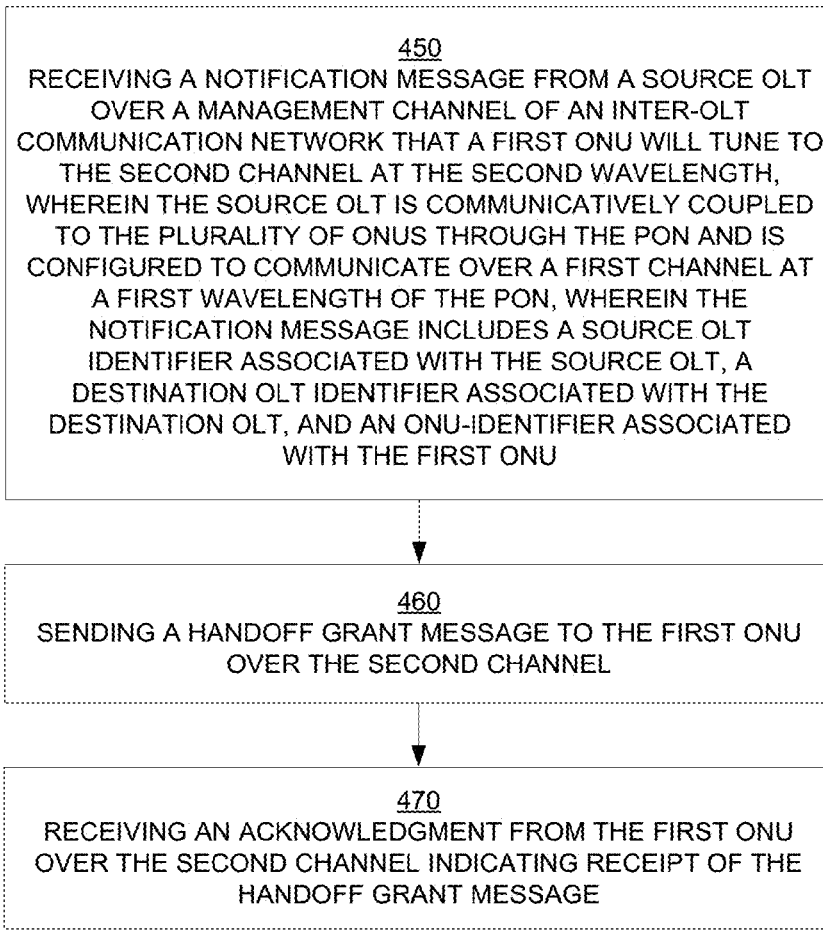

FIG. 4B is a flow diagram 400B illustrating an exemplary process for handing off communications of at least one channel used by an ONU from a source OLT to a destination OLT as implemented by the destination OLT, in accordance with one embodiment of the present disclosure. In one embodiment, flow diagram 400B is a computer implemented method for handing off communications of at least one channel used by an ONU from the source OLT to a destination OLT as implemented by the destination OLT. In another embodiment, flow diagram 400B is implemented within a computer system including a processor and memory coupled to the processor and having stored therein instructions that, if executed by the computer system causes the system to execute the method for handing off communications of at least one channel used by an ONU from the source OLT to a destination OLT as implemented by the destination OLT. In still another embodiment, instructions for performing the method are stored on a non-transitory computer-readable storage medium having computer-executable instructions for causing a computer system to perform the method for handing off communications of at least one channel used by an ONU from the source OLT to a destination OLT as implemented by the destination OLT. The operations of flow diagram 400B are implemented within an OLT shown in FIGS. 1 and 2, in some embodiments of the present disclosure. In addition, flow diagram 400B can further describe one or more operations performed during the handing off of an ONU from one OLT to another as described in the information flow diagram 300 of FIG. 3. In addition, flow diagram 400B can be implemented in conjunction with flow diagram 400A.

Flow diagram 400B discloses the process performed by a destination OLT when participating in handing off of communications of an ONU from a source OLT to the destination OLT. That is, instead of the source OLT, the destination OLT will be communicating with the ONU over the specified transmitting channel (e.g., for downstream messaging) and/or receiving channel (e.g., for upstream messages). The source OLT and the destination OLT are communicatively coupled to a plurality of ONUs through a PON, though at a specific moment in time the source OLT and the destination OLT can be coupled to different subsets of ONUs taken from the plurality.

In particular, the source OLT is configured to communicate over a first channel at a first wavelength of the PON. The destination OLT is configured to communicate over a second channel at a second wavelength of the PON. For example, the first channel and the second channel can be different combinations taken from an upstream channel and a downstream channel. In one implementation, the source OLT is communicating with ONUs over a first channel that is a downstream channel, and the destination OLT is communicating with ONUs over a second channel that is a downstream channel.

Flow diagram 400B is performed by the destination OLT during the handing off of one or more wavelengths used to communicate with an ONU. At 450, the method includes receiving a notification message from the source OLT over a management channel of an inter-OLT communication network that a first ONU will tune to the second channel at the second wavelength associated with the destination OLT. For example, the source OLT is handing off to a destination OLT downstream communication to an ONU that is currently being handled by the source OLT. In another example, the source OLT is handing off to a destination OLT upstream communication with an ONU that is currently being handled by the source OLT. In still another example, the source OLT is handing off to a destination OLT both upstream and downstream communication with an ONU that is currently being handled by the source OLT. The destination OLT can also send an acknowledgment back to the source OLT indicating receipt of the notification message.

As previously described, in one embodiment, the information necessary to implement a handoff included within the notification message is provided in a data structure. For example, the notification message includes at least one of the following: 1) a destination OLT identifier; 2) a source OLT identifier; and 3) an ONU identifier. In another embodiment, the notification message can include additional information, including at least one of the following: 1) the current downstream wavelength/channel for the ONU; 2) the current upstream wavelength/channel for the ONU; 3) a possible new downstream wavelength/channel for the ONU; 4) a possible new upstream wavelength/channel for the ONU; 5) an ONU turning start time; and 6) an acknowledge code.

At this point, during the handing off process, the destination OLT is looking for confirmation from the first ONU indicating completion of the handoff of one or more channels from the source OLT to the destination OLT. In particular, at 460, the method includes sending a handoff grant message from the destination OLT to the first ONU over the second channel.

For example, in one implementation, the source OLT is handing off downstream communication with the first ONU, such that the destination OLT will be sending downstream communications. In that case, the destination OLT is configured to ping the first ONU using the handoff grant message over the second channel, which is the downstream channel for the destination OLT.

In another example, the source OLT is handing off upstream communication with the ONU, such that the destination OLT will be receiving upstream communications from the first ONU. In that case, the first ONU can keep receiving downstream communications from the source OLT. As such, the destination OLT can send the handoff grant message through the source OLT, which acts as a proxy, as will be further described in FIG. 5.

At 470, the method includes receiving an acknowledgment from the first ONU over the second channel indicating receipt of the handoff grant message. In one embodiment, the handoff grant message is repeatedly delivered until an acknowledgment is received from the first ONU. At this point, the destination OLT terminates the periodic delivery of the handoff grant message.

In one embodiment, the handoff grant message is broadcast to a plurality of ONUs through a corresponding ODN using a downstream channel associated with the destination OLT and/or proxy OLT. The ONU intended to receive the handoff grant message determines that the message is targeted to itself, as previously described.

Figure 5:
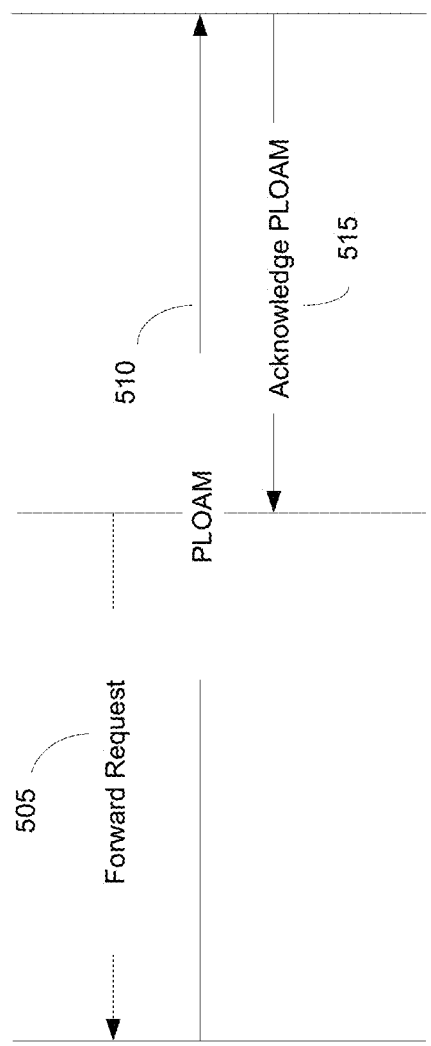
FIG. 5 is a diagram showing an exemplary flow of messages when forwarding a message directed to an ONU from a first OLT to a second OLT for delivery to the ONU, wherein the first OLT is unable to communicate with the ONU, in accordance with one embodiment of the present disclosure.

FIG. 5 is an information flow diagram 500 showing the flow of messages when forwarding a message directed to an ONU from a first OLT to a second OLT for delivery to the ONU, where the first OLT is unable to communicate with the ONU, in accordance with one embodiment of the present disclosure. For example, in a failover situation, the first OLT is unable to communicate over a downstream channel with the ONU, and has handed off this responsibility to the second OLT. The first OLT continues to communicate with the ONU on an upstream wavelength. The first OLT is able to communicate with the ONU using the second OLT as a proxy for delivering downstream messages to the OLT, such as management and control PLOAM commands. In another example, a handoff process may only handoff one channel, such as a downstream channel. That is, the source OLT has handed off the handling of downstream communications from the ONU to a destination OLT, but the source OLT still is handling upstream communication from the ONU. In that case, the source OLT is unable to communicate directly (e.g., sending management and control PLOAM commands) with the ONU on its downstream channel. As such, the source OLT is able to use the destination OLT as a proxy to communicate with the ONU. In still other embodiments, the process shown in FIG. 5 can be adapted to deliver upstream communications from the ONU to the first OLT using the second OLT as a proxy, such as when the ONU communicates with the first OLT using a downstream channel, but communicates with the second OLT using the upstream channel.

Specifically, the messages shown in FIG. 5 are delivered between a first OLT (e.g., source OLT), a second OLT (e.g., destination OLT), and an ONU. The second OLT acts as a proxy for the first OLT for purposes of delivering downstream communications to the ONU. For example, the ONU upstream wavelength/channel is with the first OLT, and the ONU downstream wavelength/channel is the second OLT. As a result, the second OLT is configured to forward messages received from the first OLT to the ONU using its downstream channel.

In one embodiment, some of the forwarded messages disclosed in FIG. 5 conform with a PLOAM control message format. For example, the forwarded messages could be control and management PLOAM messages, in one embodiment. Of course, other embodiments are well suited to any suitable format used for communicating control and management messages. For example, the forwarded messages can be an upstream transmission opportunity assignment (such Bandwidth Map).

As shown in FIG. 5, at 505, the first OLT sends a forward request to the second OLT to deliver a message to the ONU. The forward request includes the message to be forwarded, such as a control and/or management PLOAM message. For example, the first OLT can have handed off responsibility of downstream communications with the ONU to the second OLT, but the first OLT is still communicating with the ONU over its upstream channel. In that case, the forwarding request is delivered from the first OLT over a management channel of an inter-OLT communication network to the second OLT.

At 510, the second OLT sends the forwarded message to the ONU using its downstream wavelength channel. In one embodiment, the forwarded message is broadcast to a plurality of ONUs through a corresponding ODN. The ONU intended to receive the forwarded message determines that the message is targeted to itself.

At 515, after receiving the forwarded message from the second OLT, the ONU can send a response to the first OLT. In the example shown in FIG. 5, the first OLT is still communicating with the ONU using an upstream wavelength/channel, and can receive upstream communications from the ONU. In one implementation, the response is an acknowledgment message confirming receipt of the forwarded message.

In one embodiment, the information necessary to implement the forwarding process is provided in a data structure. For example, the forward request message includes at least one of the following: 1) a first OLT identifier; 2) a second OLT identifier; and 3) an ONU identifier. In another embodiment, the forward request includes additional information, including at least one of the following: 1) the to-be-forwarded message; and 2) the to-be-forwarded bandwidth map. For illustration, one example provides using a source OLT as the first OLT, and the destination OLT as the second OLT. The data structure provided in a request forward message can be structured as follows:

```
{
Destination OLT-ID,
Source OLT-ID,
ONU-ID,
To-be-Forwarded PLOAM message,
To-be-Forwarded Bandwidth Map,
}
```

The inter-OLT communication shown in FIG. 5 can be used when initially tuning or retuning of ONUs across one or more OLT ports. The inter-OLT communication is able to resolve differences in tuning used by different communication formats, such as when resolving conflicts between point-to-point (PtP) WDM and TWDM-PON. In particular, when an ONU is first added to the ODN, it will go through a process of tuning its receiver to the first wavelength that it can find on the system. After tuning its receiver, it will begin the process of tuning the transmitter, based on its knowledge of the receiver OLT retrieved from the channel announcement information embedded in the downstream frame. Methods to avoid PON disruption from unexpected ONU transfers when handing over ONUs can also be implemented through the process shown in FIG. 5. The OLT may not be able to communicate to the new ONU in the initial stage, and as such, the inter-OLT communication protocol will then enable the receiving OLT to report existence of the new ONU to other OLTs. In another case, the OLT (which can command the new ONU) would, in case of an ONU misbehavior, answer by trying to disable, park, or transition the ONU (transmitter or receiver or both) via re-tuning it to a different OLT port/channel pair. In still another case, when an ONU is associated with two OLTs (for example, its upstream is with OLT1 and its downstream is with OLT2), the inter-OLT communication protocol allows the upstream OLT (e.g., OLT1) to send messages via the downstream OLT (e.g., OLT2) to the ONU. These types of inter-OLT collaborations are shown in FIG. 5. Various scenarios using inter-OLT communication are described below, including ONU activation; parking orphaned ONUs; ONUs connected to the wrong ODN; and rogue ONU isolation.

For ONU activation, discovery and ranging of ONUs can occur more efficiently if an OLT port can communicate the proper associated wavelength to use in upstream communication. When an ONU tunes to a given wavelength, the receiving OLT first checks its provisioning database and then queries other OLTs to determine the destination wavelength of the ONU and passes the wavelength assignment to the ONU. The protocol facilitates communications between the OLTs to determine the final destination of the ONU.

When parking orphaned ONUs, to prevent an ONU that is connected to the system and not assigned to any of the OLT ports from entering a continuous tuning loop, the OLT will communicate with the rest of the OLT community to determine a final destination. If the ONU is not assigned to any OLTs, then it can be parked on the OLT until the wavelength assignment can be discovered, thereby substantially minimizing resource drain and potential rogue ONU activity.

In a case where an ONU is placed on the wrong ODN, the OLT chassis can query the OLT chassis community and report the location of an ONU with respect to ODN and system appearance. This facilitates more rapid trouble resolution and helps the operator to resolve problems in activating ONUs.

With so many wavelengths in use in a PON system and with the use of tunable technology, the risk of rogue ONUs potentially increases. When a rogue ONU is present, the OLTs need to request assistance from the other OLTs in the system to isolate the ONU. The process can include asking for an "attendance report" between OLTs.

The aforementioned scenarios describe the inter-OLT communication on the same ODN or across ODNs. It is important to identify the operational situations of these scenarios, since they determine at which "real time" degree the exchanges between OLTs occur. In back office cases, for example operational situations include the following: system test in lab environment (e.g., test in a PICS approach for tuning/re-tuning operations qualification); reduction of the number of active ports (e.g., in a pay as you go context); operating expenses (OPEX) savings through temporary shutdown of underused OLT ports for power savings; and planned maintenance operations. In front office cases, for example operational situations include the following: adding an additional ONU (e.g., in self install context, or by technician intervention); ONU wake-up after a sleep period, which can depend on ONU transceiver (TRx) drift; and troubleshooting. In one implementation, inter-OLT exchanges occur in a time period sufficient to allow resumption of full operation within an acceptable period.

Figure 6:
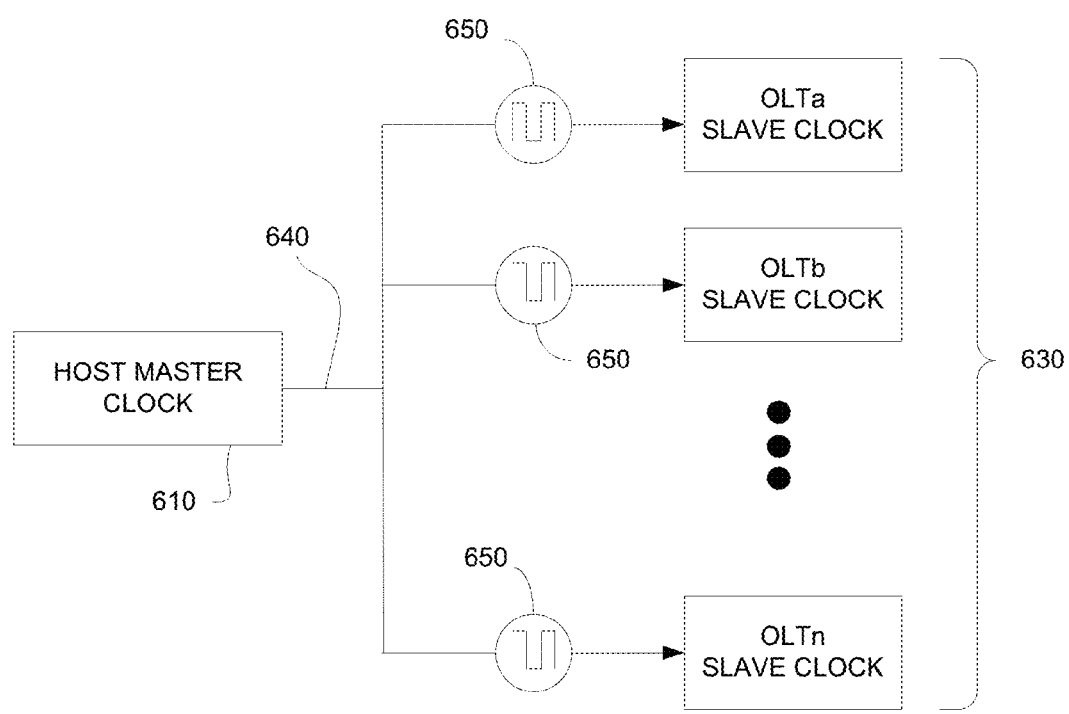
FIG. 6 is a block diagram illustrating the distribution of a master clock to a plurality of OLTs within a central office, in accordance with one embodiment of the present disclosure.

FIG. 6 is a diagram 600 illustrating the distribution of a host master clock 610 to a plurality of OLTs (e.g., OLTa-n) within a central office, in accordance with one embodiment of the present disclosure. The OLTs are associated with a plurality of slave clocks 630. As shown in FIG. 6, the host master clock 610 generates a clock signal 650 at output 640. The clock signal 650 is copied and distributed over multiple channels over logical connections to the OLTs. In that manner, the slave clock for each OLT is timed using the copied clock signal 650. In one implementation, intra-OLT cable differences can be about 100 meters, and the actual time difference between OLTs is around +/−2 μs.

In one embodiment, it is necessary to provide a reasonable quiet window alignment across all OLT ports operating on a given ODN. When several OLT chassis are used to implement a TWDM-PON system, time of day (ToD) and phase synchronization through SNI interfaces is mandatory. Synchronization is provided through the master clock. That is, the master clock is used to synchronize OLT quiet windows. Synchronization of the quiet windows among all OLTs sharing the same ODN minimizes disruption caused on a given OLT port by ONUs attempting to activate. In particular, utilizing the inter-OLT communication protocol, details about the quiet window can be shared among the OLTs. The OLTs can verify their timing source and the timing of their quiet window. The OLTs can negotiate changes in the timing window. A common reference frame for synchronization substantially minimizes the tuning/ranging for ONUs and OLTs, and thus upstream jitter is reduced, especially for mobile applications.

FIG. 7 is a table 700 illustrating exemplary ONU data elements that are passed using the inter-OLT communications protocol. FIG. 8 is a table 800 illustrating exemplary OLT data elements that are passed using the inter-OLT communications protocol. FIG. 9 is a table 900 providing a list of exemplary state change requests and notifications used by the inter-OLT communications protocol.

Several NG-PON2 transmission convergence (TC) layer functions require interaction between the NG-PON2 channel terminations (CTs) via the Inter-CT Protocol. For the TWDM CTs, these functions include, for example, the following: channel profile and status sharing; ONU activation; ONU tuning; and rogue ONU mitigation. Furthermore, the function of rogue ONU mitigation can require interaction between TWDM CTs and PtP WDM CTs. The NG-PON2 TC layer procedures implementing these functions interface with the ICT Protocol by means of ICTP Primitives. There are two types of ICTP primitives: transaction commits and messages. A transaction itself is composed of lower level message exchanges and is treated as an atomic operation. Invocations of ICTP primitives by the TC layer procedures have the following format: ICTP:<Name>(ODN ID, source (SRC), destination (DST), Parameters). FIG. 10 is a table 1000 illustrating exemplary ICTP protocol primitive invocation format elements. FIG. 11 is a table 1100 illustrating exemplary ICTP protocol primitives.

Thus, according to embodiments of the present disclosure, systems and methods are described for providing an inter-OLT communication protocol, involving data structures, to manage the discovery and transition of ONUs.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present invention and its advantages have been described in detail, it should be understood that various changes, substitutions, and alterations can be made herein without departing from the spirit and scope of the invention as defined by the appended claims. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed is:

1. An optical line terminal (OLT) coupled to a plurality of optical network units (ONUs) through a passive optical network (PON), said OLT comprising:
    a transceiver configured to communicate with a plurality of OLTs, wherein said communication includes the transceiver of the OLT sending to or receiving from at least one of the plurality of OLTs a notification, wherein said notification comprises:
    a first PON identifier (PON-ID) associated with a source OLT sending said notification, wherein said source OLT is configured to communicate over a first channel at a first wavelength of said PON;
    a second PON-ID associated with a destination OLT receiving said notification, wherein said destination OLT is configured to communicate over a second channel at a second wavelength of said PON; and
    an ONU identifier associated with a first ONU associated with said notification.

2. The OLT of claim 1, wherein said OLT comprises said source OLT, wherein said source OLT is configured to provide said notification to said destination OLT indicating that said first ONU will tune to said second channel at said second wavelength associated with said destination OLT.

3. The OLT of claim 1, wherein said OLT comprises said destination OLT that is configured to receive said notification from said source OLT.

4. The OLT of claim 1, wherein said OLT comprises said source OLT that is configured to receive a first acknowledgment from said destination OLT indicating receipt of said notification, and a second acknowledgment from said first ONU indicating receipt of a tune wavelength message that is sent by said source OLT to said first ONU to instruct said first ONU to tune to said second channel at said second wavelength.

5. The OLT of claim 1, where said notification comprises at least part of a physical layer operations administration maintenance (PLOAM) message.

6. The OLT of claim 5, wherein said OLT comprises said destination OLT configured to send at least part of said notification to said first ONU over a downstream channel at a downstream wavelength associated with said destination OLT.

7. The OLT of claim 1, wherein said notification further comprises ONU channel information indicating at least one of an ONU current upstream wavelength or channel (wavelength/channel), an ONU current downstream wavelength/channel, an ONU new upstream wavelength/channel, or an ONU new downstream wavelength/channel.

8. The OLT of claim 1, wherein said source OLT is further configured to send a tune wavelength message to said first ONU over said first channel with the tune wavelength message instructing said first ONU to tune to said second channel at said second wavelength and comprising:
   said first PON-ID associated with said source OLT;
   said second PON-ID associated with said destination OLT; and
   said ONU identifier.

9. The OLT of claim 1, wherein said transceiver is configured to communicate via a management channel of a communication network with the plurality of OLTs.

10. A method for performing a network management in an optical line terminal (OLT), comprising:
    communicating, by said OLT, with one or more first optical network units (ONUs) over a first channel at a first wavelength of said PON through a passive optical network (PON);
    sending, by said OLT, a notification for a first ONU of said one or more first ONUs to a destination OLT with said notification comprising:
      a first PON identifier (PON-ID) associated with said OLT;
      a second PON-ID associated with said destination OLT receiving said notification, said destination OLT being configured to communicate over a second channel at a second wavelength of said PON; and
      an ONU identifier associated with said first ONU.

11. The method of claim 10, further comprising:
    receiving, by said OLT, a first acknowledgment from said destination OLT indicating receipt of said notification; and
    receiving, by said OLT, a second acknowledgment from said first ONU indicating receipt of a tune wavelength message that is sent by said OLT to said first ONU to instruct said first ONU to tune to said second channel at said second wavelength.

12. The method of claim 10, where said notification sent by said OLT to said destination OLT comprises at least part of a physical layer operations administration maintenance (PLOAM) message.

13. The method of claim 10, wherein said notification further comprises ONU channel information indicating at least one of an ONU current upstream wavelength or channel (wavelength/channel), an ONU current downstream wavelength/channel, an ONU new upstream wavelength/channel, or an ONU new downstream wavelength/channel.

14. The method of claim 10, wherein said notification is sent by said OLT via a management channel of a communication network with said destination OLT.

15. A method for performing a network management in an optical line terminal (OLT), said method comprising:
    communicating, by said OLT, with one or more first ONUs over a first channel at a first wavelength of a passive optical network (PON);
    receiving, by said OLT, a notification sent by a source OLT of said PON with said notification comprising:
      a first PON identifier (PON-ID) associated with said source OLT that is configured to communicate with a first ONU over a second channel at a second wavelength of said PON;
      a second PON-ID associated with a destination OLT receiving said notification; and
      an ONU identifier associated with said first ONU.

16. The method of claim 15, further comprising:
    sending, by said OLT, a first acknowledgment to said source OLT indicating receipt of said notification.

17. The method of claim 15, where said notification sent by said OLT to said destination OLT comprises at least part of a physical layer operations administration maintenance (PLOAM) message.

18. The method of claim 17, said method further comprising:
    sending, by said OLT, at least part of said notification to said first ONU over a downstream channel at a downstream wavelength associated with said OLT.

19. The method of claim 15, wherein said notification further comprises ONU channel information indicating at least one of an ONU current upstream wavelength or channel (wavelength/channel), an ONU current downstream wavelength/channel, an ONU new upstream wavelength/channel, or an ONU new downstream wavelength/channel.

20. The method of claim 15, wherein said notification is received by said OLT via a management channel of a communication network from said source OLT.

* * * * *